(12) United States Patent
Matahira et al.

(10) Patent No.: US 10,439,461 B2
(45) Date of Patent: Oct. 8, 2019

(54) ROTARY ELECTRIC MACHINE HAVING INSULATOR MATERIAL FILLED BETWEEN CONDUCTIVE BODIES

(71) Applicant: Hitachi Automotive Systems, Ltd., Hitachinaka-shi, Ibaraki (JP)

(72) Inventors: Hiroshi Matahira, Tokyo (JP); Yoshimi Mori, Hitachinaka (JP); Takahiro Oomori, Hitachinaka (JP); Takayuki Koizumi, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 153 days.

(21) Appl. No.: 15/101,175

(22) PCT Filed: Oct. 31, 2014

(86) PCT No.: PCT/JP2014/079011
§ 371 (c)(1),
(2) Date: Jun. 2, 2016

(87) PCT Pub. No.: WO2015/083470
PCT Pub. Date: Jun. 11, 2015

(65) Prior Publication Data
US 2017/0005537 A1   Jan. 5, 2017

(30) Foreign Application Priority Data
Dec. 5, 2013   (JP) .................................. 2013-251601

(51) Int. Cl.
*H02K 3/12*   (2006.01)
*H02K 3/50*   (2006.01)
(Continued)

(52) U.S. Cl.
CPC ............... *H02K 3/12* (2013.01); *H02K 1/16* (2013.01); *H02K 1/26* (2013.01); *H02K 3/38* (2013.01);
(Continued)

(58) Field of Classification Search
CPC .............................. H02K 3/34; H02K 3/345
(Continued)

(56) References Cited

U.S. PATENT DOCUMENTS

| 3,334,255 A | 8/1967 | Peters | |
| 6,762,520 B1 * | 7/2004 | Ehrhart | H02K 1/20 310/208 |

(Continued)

FOREIGN PATENT DOCUMENTS

| CN | 101675572 A | 3/2010 |
| CN | 102624125 A | 8/2012 |

(Continued)

OTHER PUBLICATIONS

"Stagger, v." OED Online. Oxford University Press, Dec. 2018. Web. Feb. 1, 2019. (Year: 2019).*

(Continued)

*Primary Examiner* — Thomas Truong
(74) *Attorney, Agent, or Firm* — Crowell & Moring LLP (57) ABSTRACT

A rotational electric machine achieving both of productivity and insulation property is provided. A rotational electric machine includes an iron core having a plurality of slots, and a plurality of segment conductive bodies arranged in the slots, wherein the iron core includes a coil guide arranged at, at least, one of opening portions of the slots, and the coil guide includes a slot insertion portion located between the slot and the segment conductive body and at least one separation portion located between the segment conductive bodies, and the slot insertion portion and the separation (Continued)

portion are arranged in the slot together with the segment conductive body.

7 Claims, 14 Drawing Sheets

(51) Int. Cl.
*H02K 1/16* (2006.01)
*H02K 1/26* (2006.01)
*H02K 3/38* (2006.01)
*H02K 3/34* (2006.01)
*H02K 15/12* (2006.01)
*H02K 15/00* (2006.01)
*H02K 15/06* (2006.01)

(52) U.S. Cl.
CPC .............. *H02K 3/50* (2013.01); *H02K 3/34* (2013.01); *H02K 3/345* (2013.01); *H02K 15/0087* (2013.01); *H02K 15/067* (2013.01); *H02K 15/12* (2013.01); *H02K 2213/12* (2013.01)

(58) Field of Classification Search
USPC .......... 310/214, 215, 179, 180, 195, 198, 71
See application file for complete search history.

(56) References Cited

U.S. PATENT DOCUMENTS

| | | | | |
|---|---|---|---|---|
| 2004/0145267 A1* | 7/2004 | Lowry | ................... | H02K 3/487 310/215 |
| 2005/0110361 A1* | 5/2005 | Blouin | ................... | H02K 1/165 310/216.012 |
| 2008/0007133 A1* | 1/2008 | Onimaru | ................... | H02K 3/14 310/208 |
| 2010/0213784 A1* | 8/2010 | Iizuka | ................... | H02K 1/148 310/208 |
| 2010/0253175 A1* | 10/2010 | Kaiser | ................... | H02K 3/38 310/215 |
| 2012/0194028 A1* | 8/2012 | Rhoads | ................... | H02K 3/34 310/215 |
| 2012/0238142 A1 | 9/2012 | Chamberlin et al. | | |

FOREIGN PATENT DOCUMENTS

| | | |
|---|---|---|
| DE | 103 50 171 A1 | 6/2005 |
| EP | 1 076 400 A2 | 2/2001 |
| EP | 1 241 774 A2 | 9/2002 |
| JP | 2002-176754 A | 6/2002 |
| JP | 2007-312549 A | 11/2007 |
| JP | 2012-161195 A | 8/2012 |
| WO | WO 2007/132321 A2 | 11/2007 |

OTHER PUBLICATIONS

Extended European Search Report issued in counterpart European Application No. 14867049.0 dated Jul. 7, 2017 (11 pages).
International Search Report (PCT/ISA/210) issued in PCT Application No. PCT/JP2014/079011 dated Jan. 27, 2015 with English-language translation (two (2) pages).
Japanese-language Written Opinion (PCT/ISA/237) issued in PCT Application No. PCT/JP2014/079011 dated Jan. 27, 2015 (three (3) pages).
Chinese-language Office Action issued in counterpart Chinese Application No. 201480066283.8 dated May 24, 2018 (six pages).
European Office Action issued in counterpart European Application No. 14867049.0 dated Jul. 18, 2018 (12 pages).

* cited by examiner

ROTARY ELECTRIC MACHINE HAVING INSULATOR MATERIAL FILLED BETWEEN CONDUCTIVE BODIES

TECHNICAL FIELD

The present invention relates to a rotational electric machine.

BACKGROUND ART

Rotational electric machines generate a rotating magnetic field by supplying an alternating current to a stator winding wire, and allow the rotating magnetic field to rotate a rotor. The rotational electric machines can further convert mechanical energy applied to the rotator into electric energy and output an alternating current from the coil. Thus, the rotational electric machine can act as an electric motor or a generator. An example of a method for ensuring electrical insulation of such rotational electric machine is, for example, PTL 1. PTL 1 discloses a method for installing a coil guide on a stator iron core end surface, and ensuring electrical insulation of a stator iron core and an electric conductive body when an electric conductive body is twisted.

CITATION LIST

Patent Literature

PTL 1: JP 2007-312549 A

SUMMARY OF INVENTION

Technical Problem

In a case where the electric conductive body is inserted into the stator iron core with the conventional coil guide as disclosed in PTL 1, the electric conductive body comes into contact with the inner wall of the stator iron core, so that the electric conductive body may be damaged, and the insulation coating of the electric conductive body may be damaged. Accordingly, a sufficient electrical insulation cannot be ensured between the stator iron core and the electric conductive body.

Accordingly, it is an object of the present invention to provide a rotational electric machine that achieves both of the productivity and the insulation property.

Solution to Problem

In order to solve the above problem, for example, a configuration as described in the claims is employed. The present application includes a plurality of means for solving the above problems, but is, for example, characterized in that a rotational electric machine includes an iron core having a plurality of slots, and a plurality of segment conductive bodies arranged in the slots, wherein the iron core includes a coil guide arranged at, at least, one of opening portions of the slots, and the coil guide includes a slot insertion portion located between the slot and the segment conductive body and at least one separation portion located between the segment conductive bodies, and the slot insertion portion and the separation portion are arranged in the slot together with the segment conductive body.

Advantageous Effects of Invention

According to the present invention, a rotational electric machine that achieves both of the productivity and the insulation property can be provided.

Problems, configurations, and effects other than those described above will be understood from the following explanation about embodiments.

DESCRIPTION OF EMBODIMENTS

Hereinafter, a mode for carrying out the present invention will be explained with reference to drawings.

A rotational electric machine according to the present embodiment is a rotational electric machine suitable for use in driving an automobile. The so-called electric vehicles using a rotational electric machine include a hybrid electric vehicle (HEV) having both an engine and a rotational electric machine, and a pure electric vehicle (EV) which runs only by means of a rotational electric machine without the use of an engine. The rotational electric machine described below can be used for both types. A description here is given on the basis of a rotational electric machine used for the hybrid automobile representing both the types.

In the following explanation, an "axial direction" means a direction along a rotation axis of a rotational electric machine. A circumferential direction means a direction along a rotation direction of a rotational electric machine. A "diameter direction" means a radial direction (radius direction) where the rotation axis of the rotational electric machine is defined as the center. An "inner circumference side" means a diameter direction inner side (inner diameter side), and an "external circumferential side" means a direction opposite thereto, i.e., a diameter direction external side (external diameter side).

Figure 1:
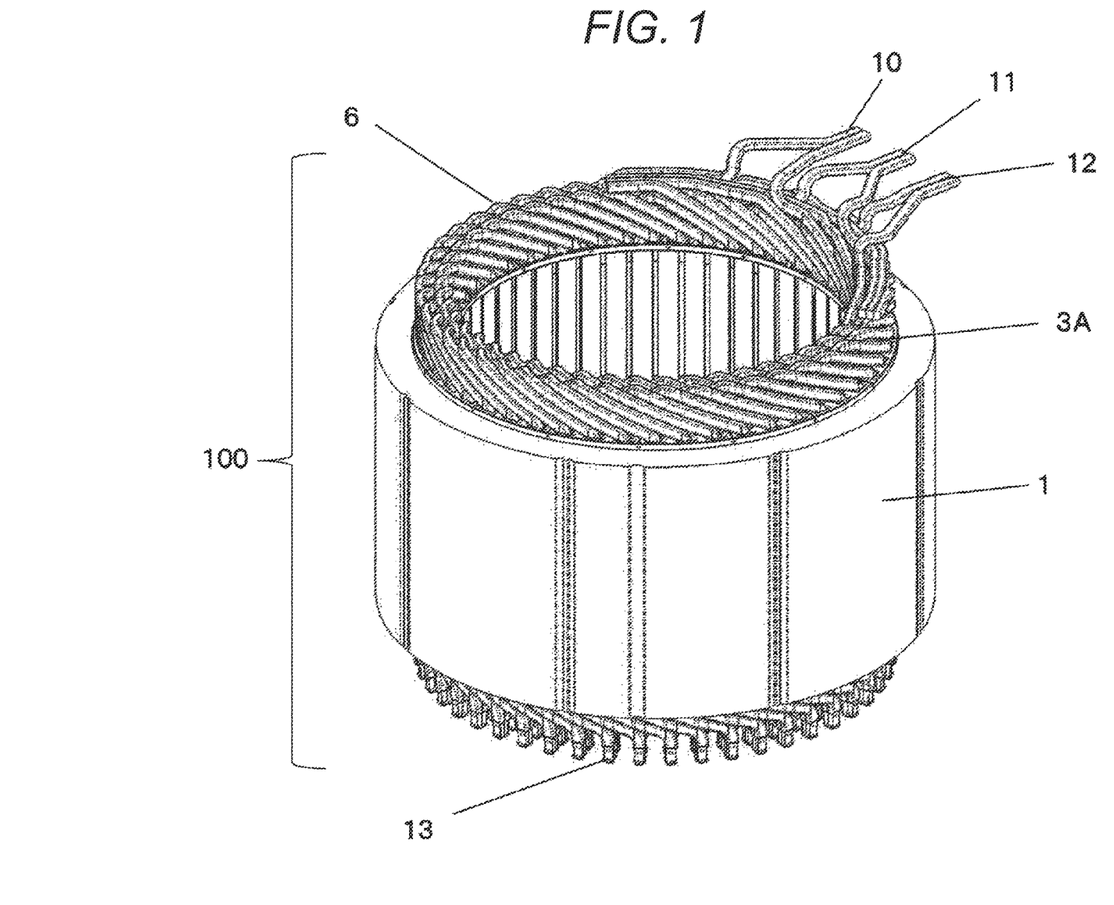
FIG. 1 is a schematic diagram illustrating an entire configuration of a stator of a rotational electric machine.
Figure 14:
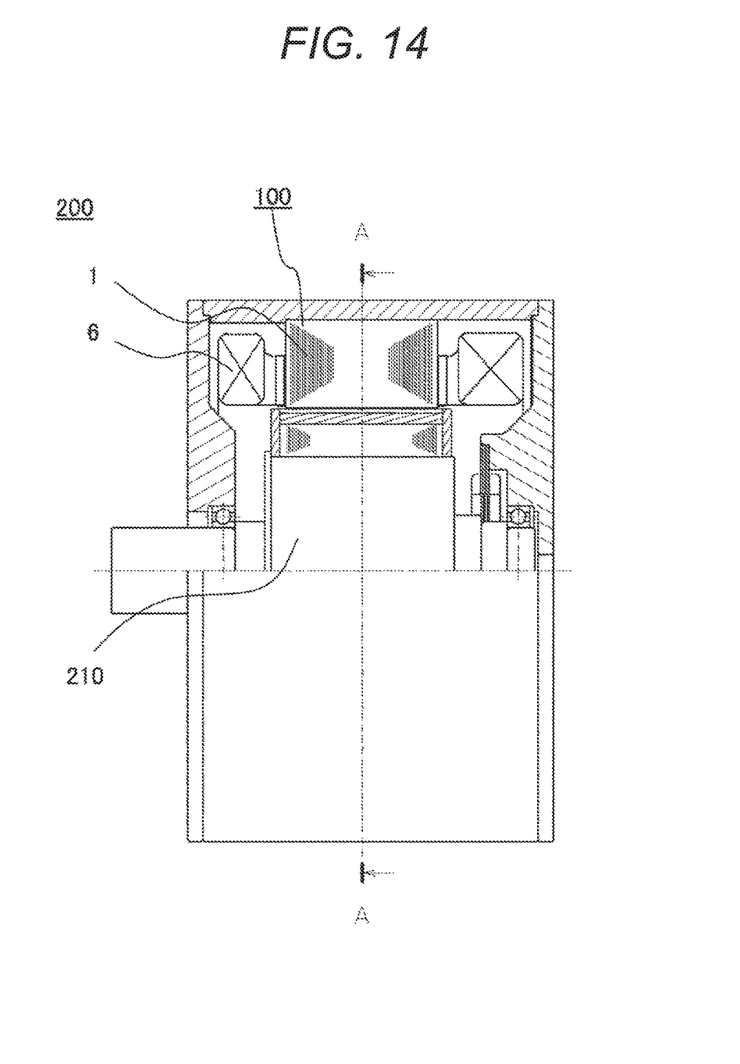
FIG. 14 is a cross sectional view illustrating the entire rotational electric machine.

FIG. 14 is a cross sectional view illustrating an entire configuration of a rotational electric machine 200 according to an embodiment of the present invention. This rotational electric machine 200 is a three phase synchronous motor having a permanent magnet built therein. The rotational electric machine 200 operates as an electric motor that rotates the rotator 210 with the supply of a three phase alternating electric current to the insulation coating-attached connection lines 10, 11, 12 as illustrated in FIG. 1. When the rotational electric machine 200 is driven by the engine, the rotational electric machine 200 operates as an electric power generator, and outputs a generated electric power of three phase alternating current. More specifically, the rotational electric machine 200 has both of a function as the electric motor that generates a rotating torque on the basis of an electric energy, and a function as an electric power generator that generates an electric power on the basis of a mechanical energy, and can selectively use the above functions according to a travel state of the automobile.

FIG. 1 is a perspective view illustrating an entire configuration of the stator 100 of the rotational electric machine according to an embodiment of the present invention. The stator 100 of the rotational electric machine of FIG. 1 includes a stator iron core 1, an insulation coating-attached coil 6, insulation coating-attached connection lines 10, 11, 12, and a coil guide 3. The insulation coating-attached coil 6 is, for example, a segment conductive body formed in a U shape.

Figure 2:
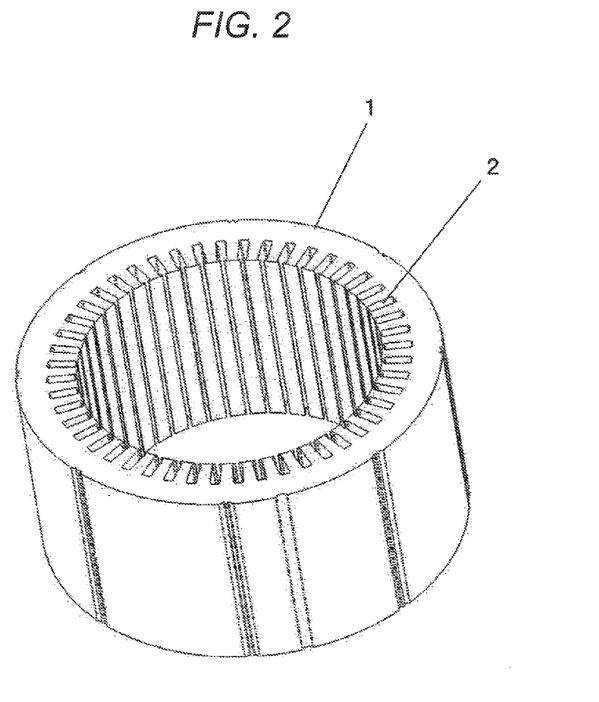
FIG. 2 is a perspective view illustrating a stator iron core of the rotational electric machine.

FIG. 2 is a perspective view illustrating the stator iron core 1. The stator iron core 1 is built up from electromagnetic steel laminations of a thickness in the range of about 0.05 to about 1.0 mm. The electromagnetic steel is formed by stamp out processing or etching processing. The electromagnetic steel laminations are fixed with welding, so that the stator iron core 1 is formed.

Figure 3:
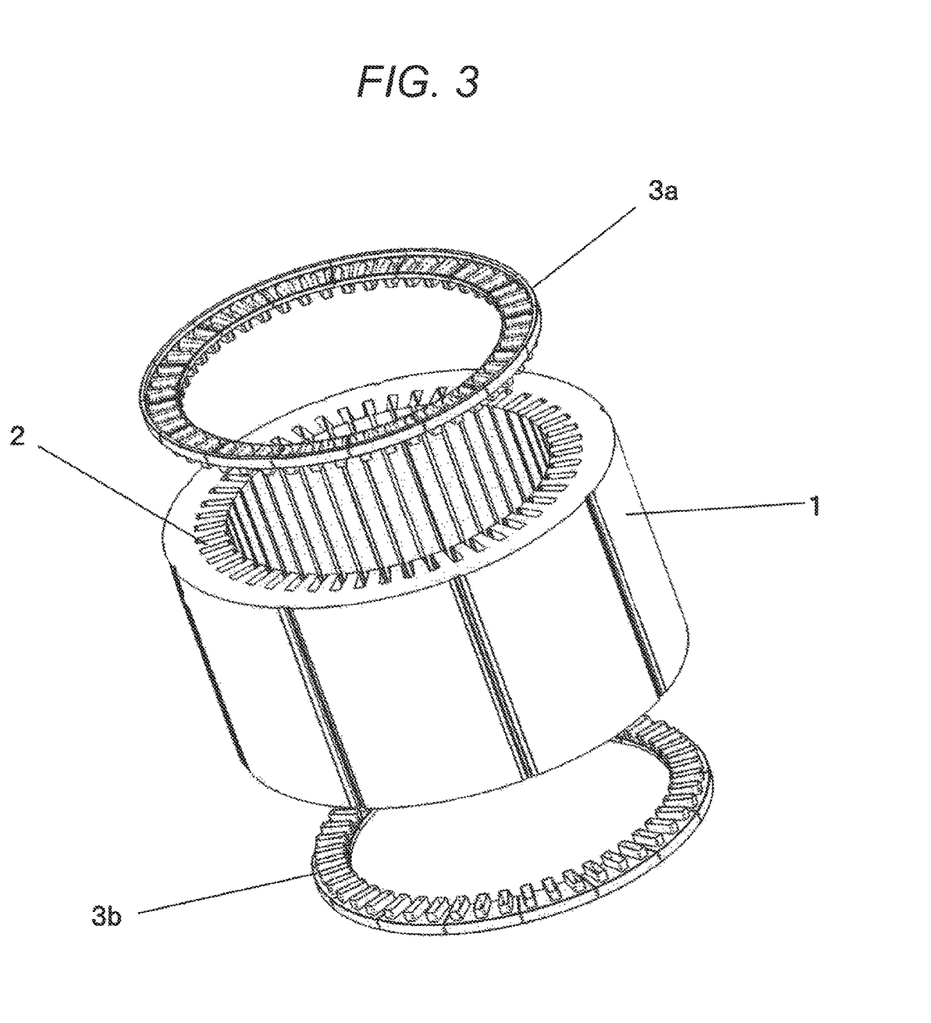
FIG. 3 is a perspective view illustrating a stator iron core 1 and a coil guide

FIG. 3 is a perspective view illustrating the stator iron core 1 and a perspective view illustrating the coil guide 3a and the coil guide 3b, and is a perspective view before the coil guide 3a and the coil guide 3b are assembled with the stator iron core 1. The coil guides 3a, 3b are composed of an insulating material such as resin material or nonconductive metal. The coil guides 3a, 3b is provided with a flange portion 43 at one end in the axial direction. In the present embodiment, the coil guide 3a and the coil guide 3b are assembled with all of the slots 2 of the stator iron core 1. The size in the circumferential direction of the coil guide 3a and the coil guide 3b may be integrated in the circumferential direction (circular shape), or may be in a divided shape divided into as many parts as the number of the slots 2.

FIGS. 4 (a) to 4(f) are perspective views illustrating the coil guide 3, and cross sectional views thereof. The coil guide 3 includes an opening portion 5, an iron core insertion portion 41 provided at one end in the axial direction, and a flange portion 43 provided at the other end in the axial direction. The insulation coating-attached coil 6 and the insulation coating-attached connection lines 10, 11, 12 are inserted into the opening portion 5. The slot insertion portion 41 is a portion that in inserted into the slot 2 of the stator iron core 1 in a case where the coil guide 3 is assembled with the stator iron core 1. The flange portion 43 is a portion covering a side surface portion (axial direction end portion) of the stator iron core located at the circumference of the slot.

The number of opening portions 5 of the coil guide 3 and the shape of the opening portions 5 of the coil guide 3 may be considered to be changed into various numbers and shapes. For example, as FIG. 4 (a) and FIG. 4 (b), the opening portion 5 may be configured such that one opening portion is provided for one slot. In this case, the shape of the opening portion 5 may be the same shape as the slot 2. As illustrated in FIG. 4(c), FIG. 4(d), FIG. 4(e), FIG. 4(f), the opening portions 5 may be divided by separation portions 42 in the diameter direction. In this case, as illustrated in FIG. 4 (c), FIG. 4 (d), it may be possible to provide multiple opening portions 5 as many as the number of the insulation coating-attached coils 6, the insulation coating-attached connection lines 10, 11, 12 inserted therein, or as illustrated in FIG. 4(e), FIG. 4(f), it may be possible to make such a configuration that multiple insulation coating-attached coils 6 and insulation coating-attached connection lines 10, 11, 12 are inserted into a single opening portion 5 (in the example of FIG. 4 (e), FIG. 4 (f), two opening portions 5 for a single slot).

In the opening portion 5, coil clearances 15a, 15b are provided. The coil clearances 15a, 15b are provided at least in a direction in which the twisting portion 13 is twisted when the twisting portion 13 of the insulation coating-attached coil 6 and the insulation coating-attached connection lines 10, 11, 12 explained later is twisted in the circumferential direction. For example, in the example of FIG. 4(a), FIG. 4(b), the coil clearances 15a, 15b are provided at both sides in the circumferential direction, and in the example of FIG. 4 (c), FIG. 4(d), FIG. 4(e), FIG. 4(f), the coil clearances 15a, 15b are provided at one side in the circumferential direction (a side to which the twisting portion 13 is twisted).

Figure 4A:
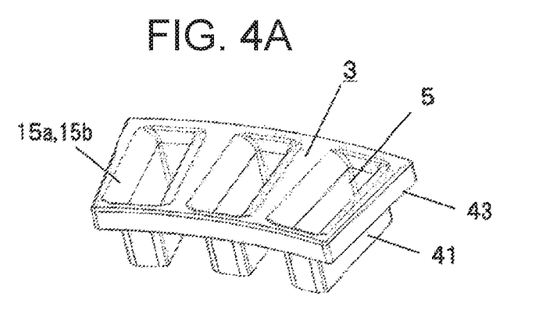
FIGS. 4A to 4F are perspective views and cross sectional views illustrating the coil guide 3.
Figure 4B:
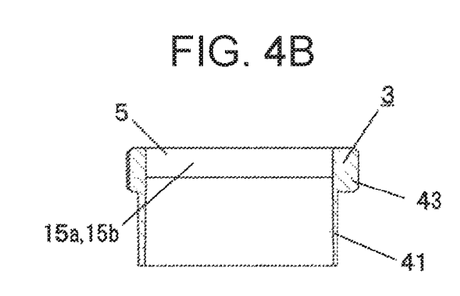
Figure 4C:
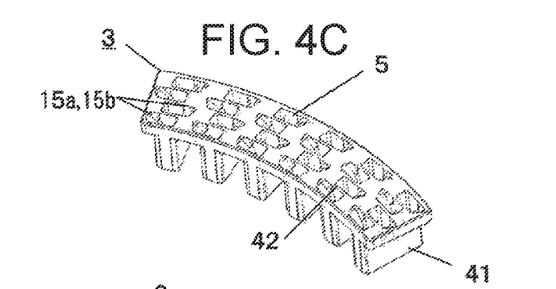
Figure 4D:
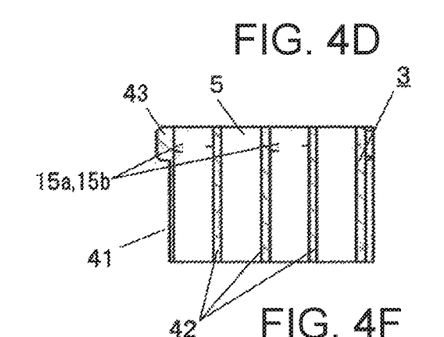
Figure 4E:
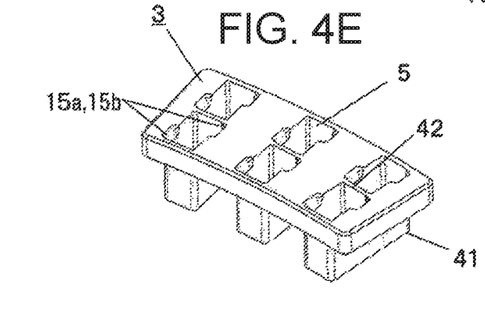
Figure 4F:
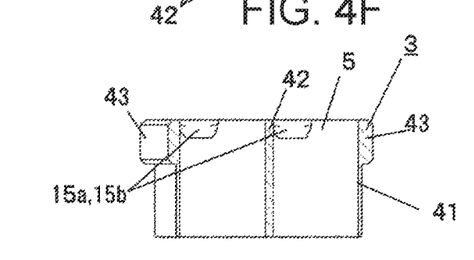

It should be noted that the configuration in which the twisting portion 13 as illustrated in FIG. 4(a), FIG. 4(b) is provided at both sides in the circumferential direction is also possible in a case where the separation portions 42 as illustrated in FIG. 4(c), FIG. 4(d), FIG. 4(e), FIG. 4(f) are provided.

The configuration in which the twisting portion 13 as illustrated in FIG. 4(c), FIG. 4(d), FIG. 4(e), FIG. 4(f) is provided at one side in the circumferential direction may also be said to be a configuration in which coil clearances 15a, 15b facing one side in the circumferential direction and coil clearances 15a, 15b facing the other side in the circumferential direction are provided to be arranged in an alternate manner. Although not illustrated in the drawings, such configuration is also possible in an example where the separation portions 42 are not provided as illustrated in FIG. 4(a), FIG. 4(b).

Figure 5:
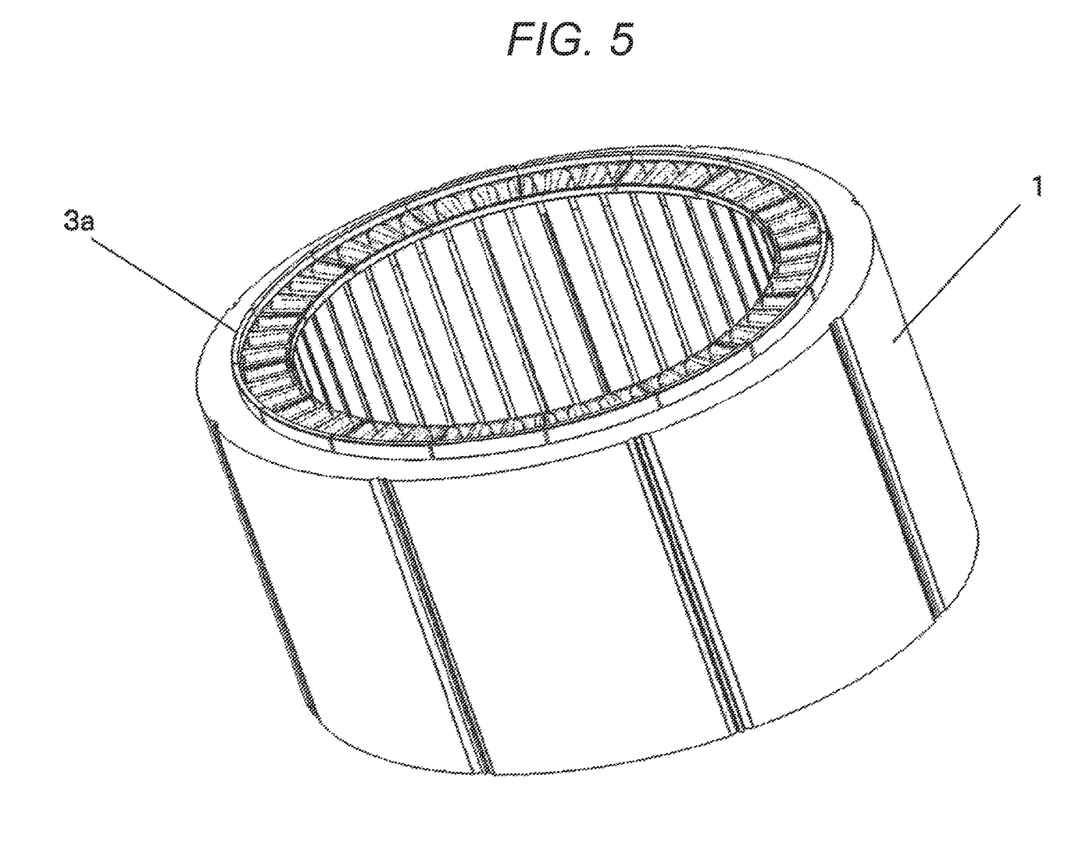
FIG. 5 is a perspective view in which the coil guide 3 is combined with the stator iron core 1.

FIG. 5 is a perspective view in which the coil guide 3 is assembled with the stator iron core 1. The slot insertion portion 41 of the coil guide 3 is inserted into the slot 2 of the stator iron core 1. The inserted coil guide 3 presses the inner wall of the slot 2 with such a force that the coil guide 3 is not dropped out of the slot 2 of the stator iron core 1 by its own weight. However, the coil guide 3 may not be necessarily configured to press the inner wall of the slot 2, and other methods (for example, applying an adhesive agent) for maintaining a contact between the coil guide 3 and the stator iron core 1 may be employed.

Figure 6:
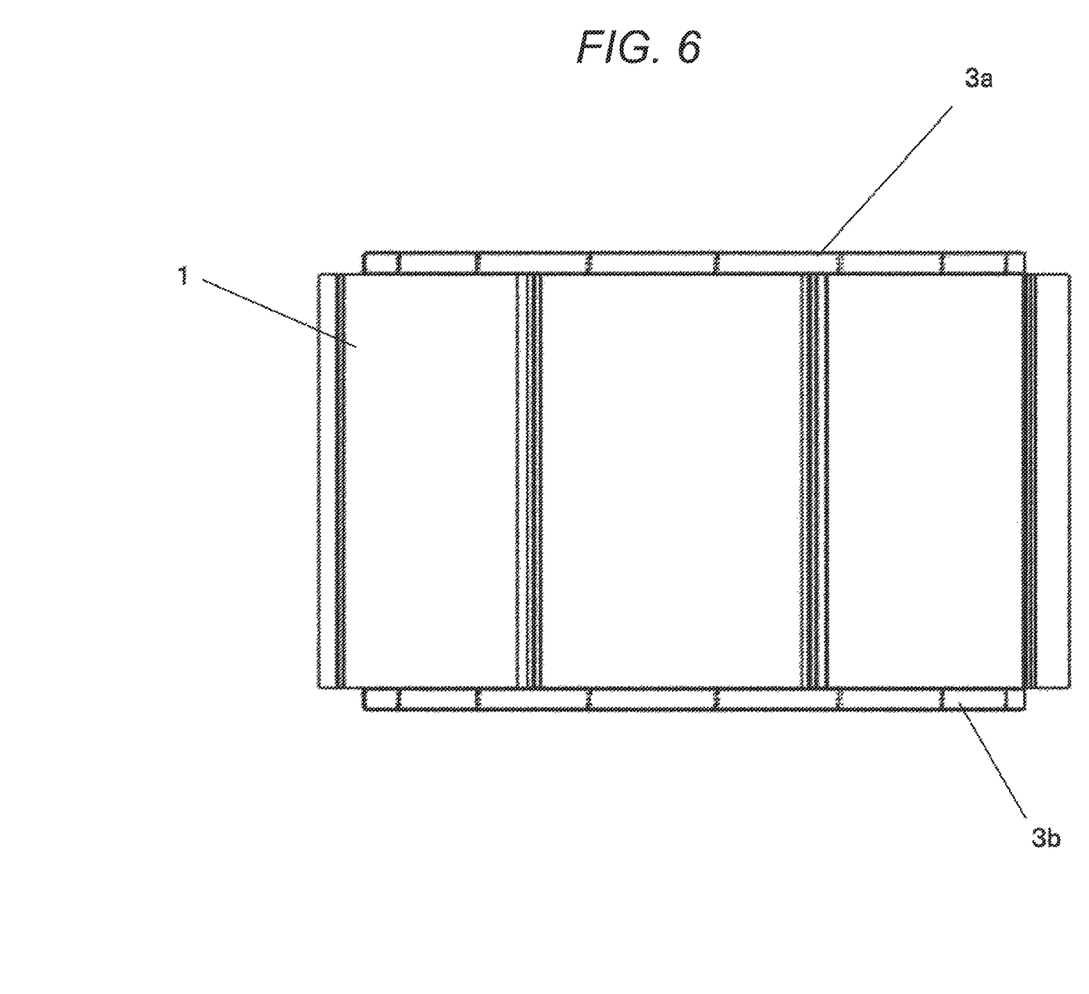
FIG. 6 is a side surface view of FIG. 5.

FIG. 6 is a side surface view in which the coil guide 3a and the coil guide 3b are assembled with the stator iron core 1. As illustrated in FIG. 6, the coil guide 3a and the coil guide 3b are assembled with both end surfaces of the stator iron core 1.

Figure 7:
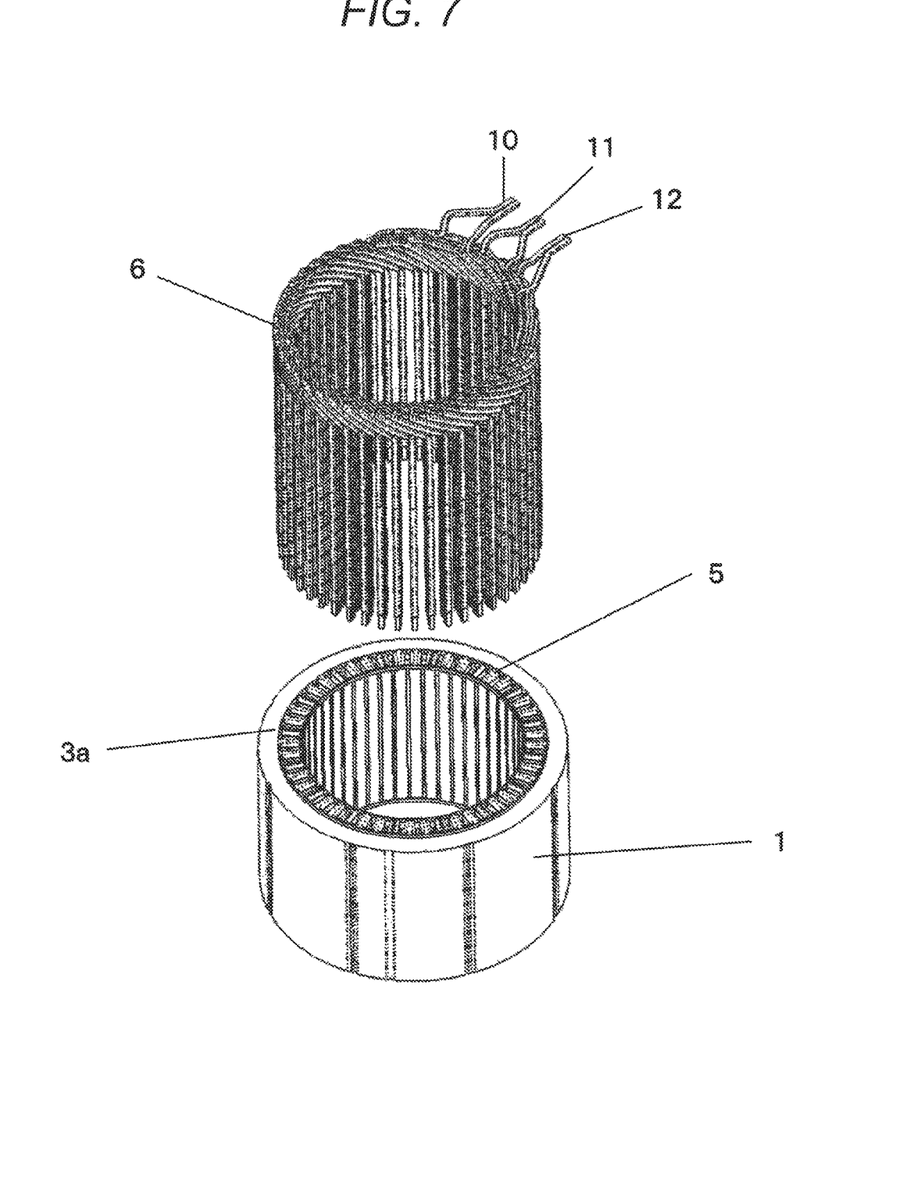
FIG. 7 is a perspective view in a state before an insulation coating-attached coil 6 and insulation coating-attached connection lines 10, 11, 12 are inserted into the stator iron core 1 obtained by combining the coil guides 3a, 3b.

FIG. 7 is a perspective view in a state before the insulation coating-attached coil 6 and the insulation coating-attached connection lines 10, 11, 12 are assembled with the stator iron core 1 assembled with the coil guides 3a, 3b. The insulation coating-attached coil 6 and the insulation coating-attached connection lines 10, 11, 12 are inserted from the axial direction into the opening portion 5 of the coil guide 3a.

Figure 8:
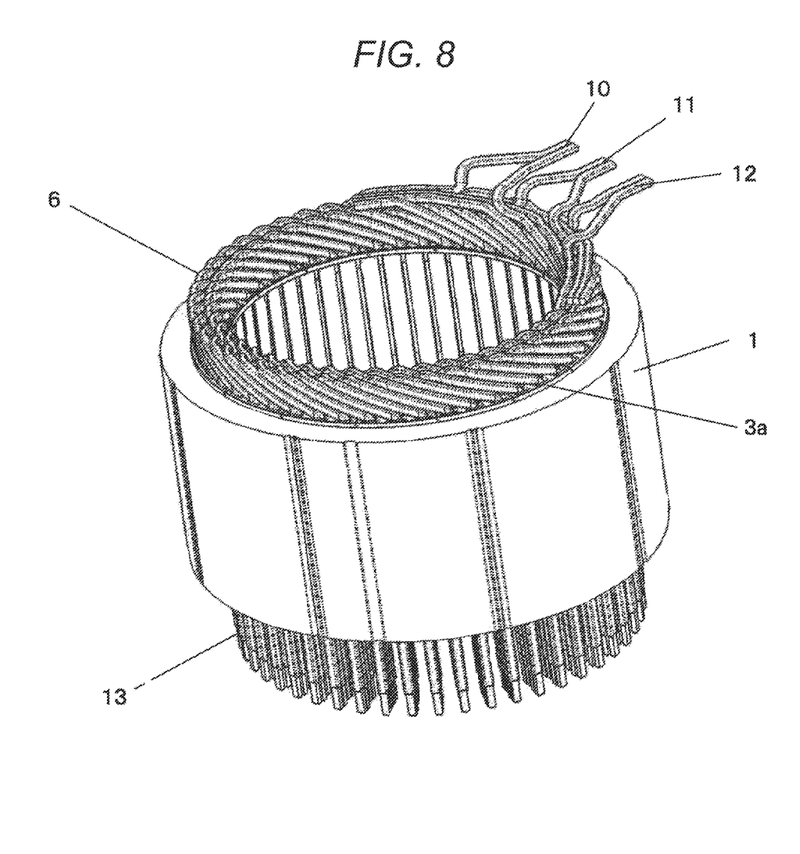
FIG. 8 is a perspective view in a state after the insulation coating-attached coil 6 and the insulation coating-attached connection lines 10, 11, 12 are inserted into the stator iron core 1 obtained by combining the coil guides 3a, 3b.

FIG. 8 is a perspective view in which the insulation coating-attached coil 6 and the insulation coating-attached connection lines 10, 11, 12 are inserted into the stator iron core 1 assembled with the coil guides 3a, 3b. In the insertion step, the ends of the insulation coating-attached coil 6 and the insulation coating-attached connection lines 10, 11, 12 are passed through the opening portion 5 of the coil guide 3b. A portion of the insulation coating-attached coil 6 and the insulation coating-attached connection lines 10, 11, 12 protruding from the opening portion 5 of the coil guide 3b will be referred to as the twisting portion 13.

Figure 9A:
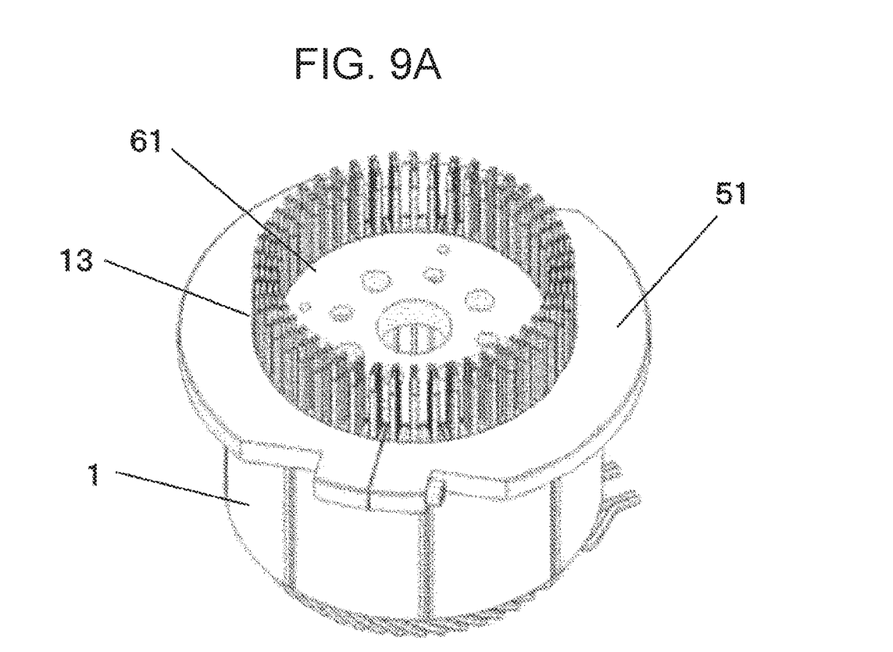
FIG. 9A is a perspective view illustrating a state in which an external diameter twisting guide 52 and an inner diameter twisting guide 61 are attached so that a load is not applied to the coil guide 3 when a twisting portion 13 is twisted after the insulation coating-attached coil 6 and the insulation coating-attached connection lines 10, 11, 12 are inserted into the slot 2 of the stator iron core 1.
Figure 9B:
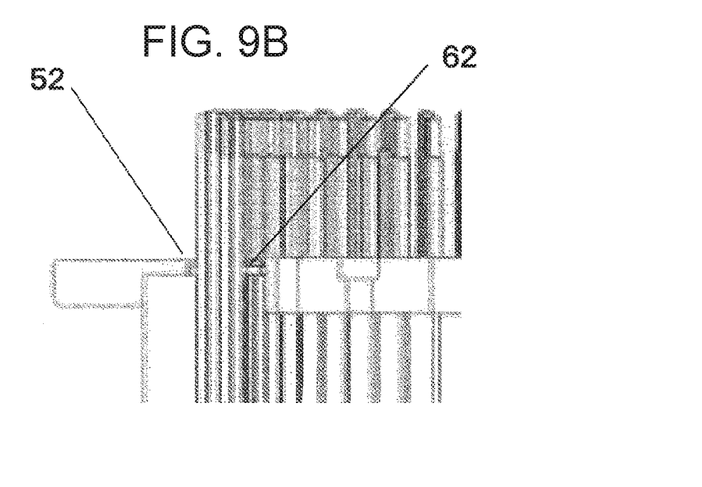
FIG. 9B is an enlarged view illustrating a cross section of FIG. 9A.

FIG. 9(a) is a perspective view in which the external diameter twisting guide 52 and the inner diameter twisting guide 61 are attached so that a load is not applied to the coil guide 3 when the twisting portion 13 is twisted after the slot 2 of the stator iron core 1, the insulation coating-attached coil 6, and the insulation coating-attached connection lines 10, 11, 12 are inserted. FIG. 9(b) is an enlarged view illustrating a cross section of FIG. 9(a). The external diameter twisting guide end portion 52 and the inner diameter twisting guide 62 are provided to sandwich the insulation coating-attached coil 6 and the insulation coating-attached connection lines 10, 11, 12, so that a load is not applied to the coil guide 3 when the twisting portion 13 is twisted.

Figure 10A:
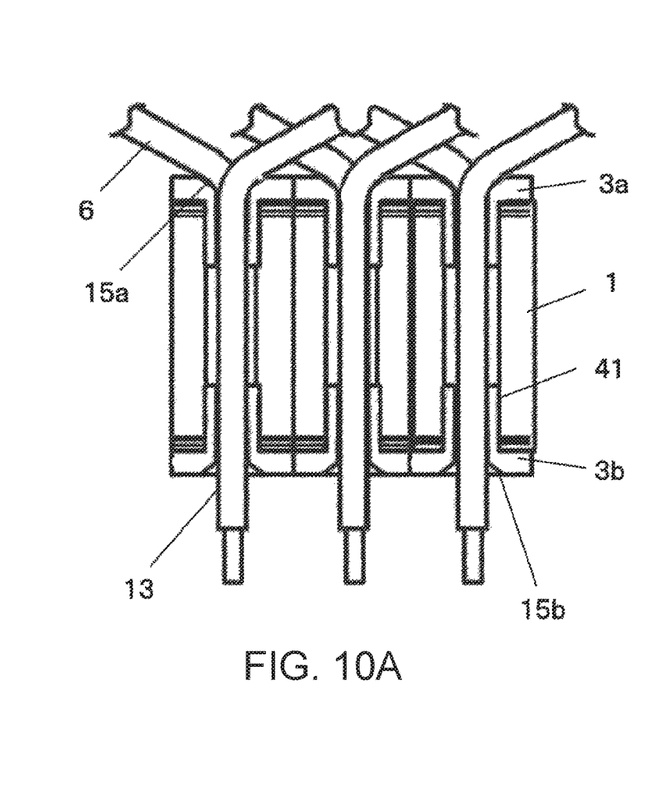
FIG. 10A is a cross sectional view in such a state that the insulation coating-attached coil 6 and the insulation coating-attached connection lines 10, 11, 12 are inserted into the slot 2 of the stator iron core 1.
Figure 10B:
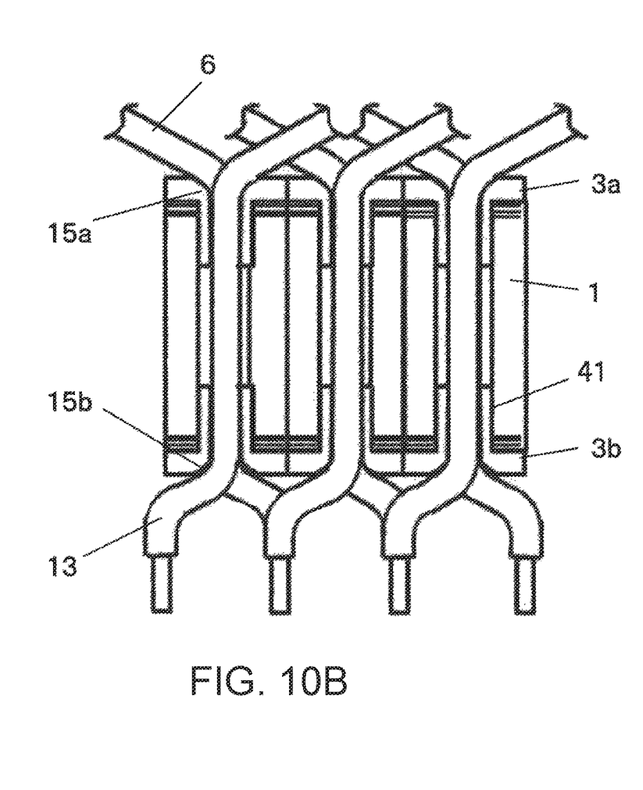
FIG. 10B is a cross sectional view in a state after the twisting portion 13 is twisted.

FIG. 10(a) is a cross sectional view in which the slot 2 of the stator iron core 1, the insulation coating-attached coil 6, and the insulation coating-attached connection lines 10, 11, 12 are inserted. FIG. 10(b) is a cross sectional view after the twisting portion 13 is twisted. The coil clearance 15a is provided so that the coil guide 3a is not broken and damaged by a large weight applied thereto when the insulation coating-attached coil 6 and the insulation coating-attached connection lines 10, 11, 12 are inserted into the coil guide 3a. The coil clearance 15a has an R surface or an inclined surface in the circumferential direction so that a load is not applied by the insulation coating-attached coil 6 and the insulation coating-attached connection lines 10, 11, 12. Likewise, the coil guide 3b is also provided with the coil clearance 15b.

Figure 11:
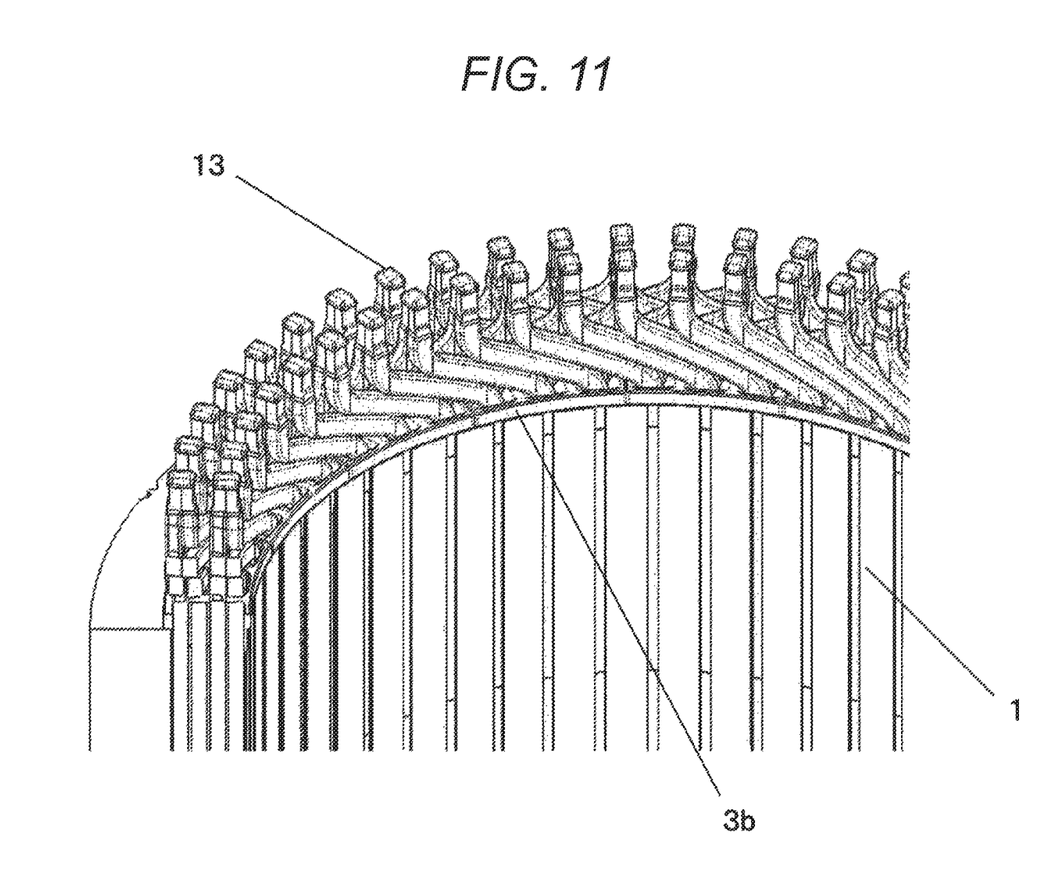
FIG. 11 is a perspective view in such a state that an end portion of the twisting portion 13 is connected.

FIG. 11 is a perspective view after the twisting portion 13 is joined by welding and the like. The connection portions are arranged with an appropriate interval from each other. In the connection method, connection is made by melting a base material of a copper line by, e.g., plasma welding and TIG welding of arc welding.

Figure 12:
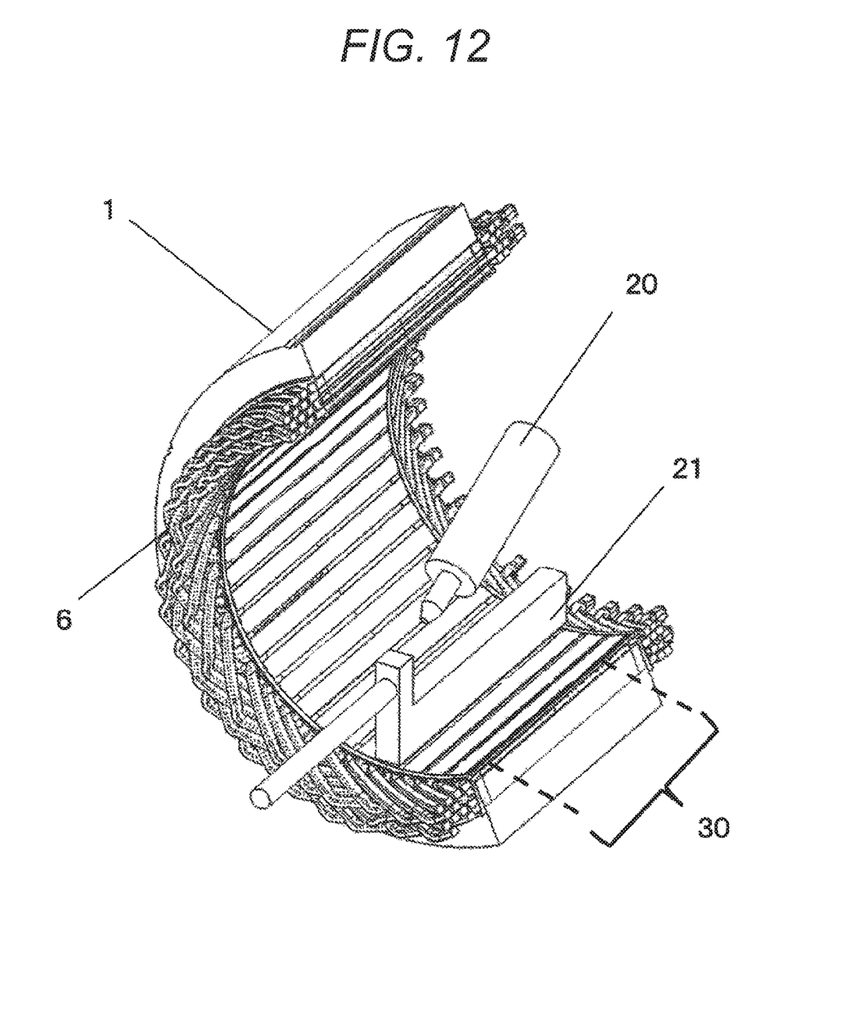
FIG. 12 is a perspective view illustrating that the insulation material filling material 31 is applied to the stator iron core 1 to which the end portion of the twisting portion 13 is connected.
Figure 13A:
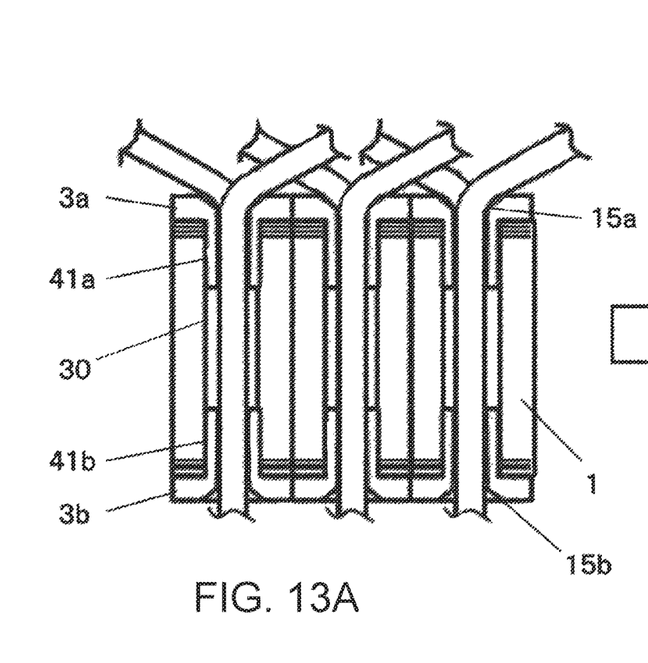
FIGS. 13A and 13B are cross sectional views illustrating the stator iron core 1 before and after the insulation material filling material 31 is applied.
Figure 13B:
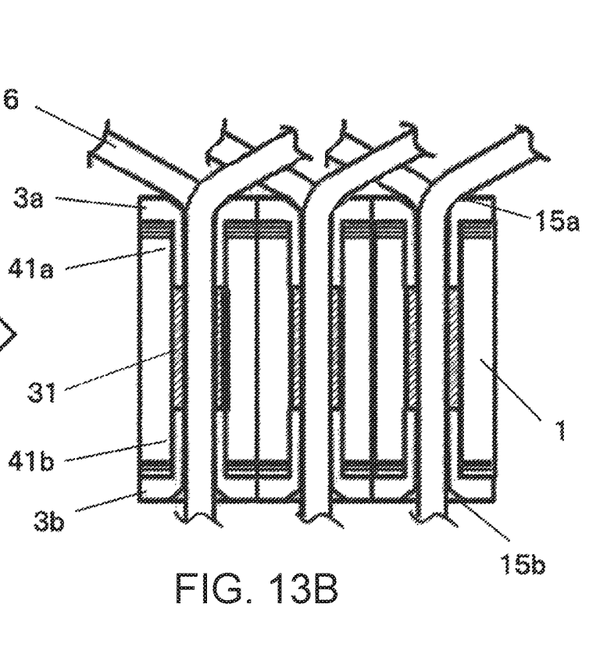

FIG. 12 is a perspective view illustrating how the insulation material filling material 31 in FIG. 13 is applied after the twisting portion 13 is joined. A configuration for applying the insulation material filling material 31 includes a dispenser 20 for applying the insulation material filling material 31, a plate 21 for limiting the insulation material filling material 31 so that more insulation material filling material 31 than necessary is not attached to the inner diameter side of the stator iron core 1, and a rotation device (not shown) fixing and rotating the stator iron core 1. The position where the insulation material filling material 31 is applied to a gap 30 between the slot 2 and the insulation coating-attached coil 6 and the insulation coating-attached connection lines 10, 11, 12. The insulation material filling material 31 is applied to the gap 30 from the inner diameter side of the stator iron core 1 by the dispenser 20. When the insulation material filling material 31 is applied, the stator iron core 1 is rotated, and the plate 21 limits the insulation material filling material 31 so that more insulation material filling material 31 than necessary is not attached to the inner side of the stator iron core 1 (for example, the insulation material filling material 31 is 0.05 mm or less). The insulation material filling material 31 may be applied by moving the dispenser 20 so that the insulation material filling material 31 is efficiently applied to the gap 30. When the insulation material filling material 31 is applied as described above, the coil guide 3 has a function of preventing the insulation material filling material 31 from leaking from the slot 2 of the stator iron core 1.

FIGS. 13(a) and 13(b) are cross sectional views illustrating the stator iron core 1 before and after the insulation material filling material 31 is applied. FIG. 13(a) is a state before the insulation material filling material 31 is applied, and FIG. 13(b) is a state after the insulation material filling material 31 is applied. Regarding the insulation material filling material 31, the insulation material filling material 31 is applied to the gap 30 between the slot 2 and the insulation coating-attached coil 6 and the insulation coating-attached connection lines 10, 11, 12 as illustrated in FIG. 13(a). After the insulation material filling material 31 is applied, the insulation material filling material 31 is filled in the gap 30, so that the stator iron core 1 and the insulation coating-attached coil 6 and the insulation coating-attached connection lines 10, 11, 12 can be fixed.

In the past, in this gap 30, for example, insulation paper (not shown) made of heat-resistant polyamide paper and nylon epoxy resin is incorporated, but according to the present embodiment, the gap 30 between the slot 2 and the insulation coating-attached coil 6 and the insulation coating-attached connection lines 10, 11, 12 is insulated by the insulation material filling material 31, so that the insulation paper can be completely eliminated.

Even when the insulation paper is provided, varnish is applied for the purpose of fixing and electrical insulation of the stator iron core and the insulation coating-attached coil, and improvement of the heat radiation property of the electric conductive body, but it is difficult to cause the varnish to infiltrate all of the insulation paper inserted in the stator iron core, and there is a problem in the fixing, insulation property, and the heat radiation. According to the present invention, the insulation paper can be abolished, and therefore, as compared with the conventional technique using the insulation paper, the present embodiment is advantageous in terms of the fixing, the heat radiation, and the insulation property. In addition, the insulation paper itself, equipment for installing the insulation paper, and the like are not necessary, and therefore, the prices of products can be suppressed and the production method can be simplified.

In the above embodiments, the stator of the rotational electric machine has been explained as an example, but the present invention can be applied to a rotator as long as a segment conductive body is inserted into a slot.

The above explanation is merely an example, and when the invention is interpreted, the invention is neither limited nor restricted by the corresponding relationship of the description about the embodiment and the description about the claims. The present invention can also be applied to a stator of a rotational electric machine such as an induction motor in the same manner. The present invention can also be applied to those other than the rotational electric machine for driving vehicles.

REFERENCE SIGNS LIST

1: stator iron core
2: slot
3: coil guide
5: opening portion
6: insulation coating-attached coil
10: insulation coating-attached connection line
11: insulation coating-attached connection line
12: insulation coating-attached connection line
13: twisting portion
15: coil clearance
20: dispenser
21: plate
30: gap
31: insulation material filling material
41: slot insertion portion
42: separation portion
51: external diameter twisting guide
52: external diameter twisting guide end portion
61: inner diameter twisting guide
62: inner diameter twisting guide end portion

The invention claimed is:

1. A rotational electric machine comprising:
an iron core having slots; and
conductive bodies forming coils, the conductive bodies being arranged in the slots, wherein
the iron core includes a coil guide arranged at, at least, one of opening portions of the slots, and the coil guide includes a slot insertion portion located between the slot and the conductive bodies and at least one separation portion that separates the conductive bodies and located between the conductive bodies,
the slot insertion portion and the separation portion are arranged in the slot together with the conductive bodies,
an insulator material is filled between the conductive bodies and the slot,
the coil guide has opening portions adjacent in a radial direction that have the same shape and are offset relative to one another in a staggered arrangement,
each opening portion includes coil clearances that extend outward, in a circumferential direction from both a radial inner end and a radial outer end, and
the coil clearance in the radial inner end extends further in the circumferential direction than the coil clearance in the radial outer end.

2. The rotational electric machine according to claim 1, wherein two coil guides arranged at both ends of the slots form a space for accumulating the insulation material filling material between the end portions facing each other in the slot.

3. The rotational electric machine according to claim 1, wherein the coil guide has a flange portion at one end in the axial direction, and the flange portion covers a side surface portion of the iron core located on a circumference of the slot.

4. The rotational electric machine according to claim 1, wherein two or more coil guides are provided in a circumferential direction.

5. The rotational electric machine according to claim 1, wherein the coil guide is made of an insulation material.

6. The rotational electric machine according to any one of claim 5, wherein the iron core is a stator.

7. The rotational electric machine according to any one of claim 5, wherein the iron core is a rotator.

\* \* \* \* \*